Feb. 20, 1945. M. M. CUNNINGHAM 2,370,014
SEAT FOR FARM IMPLEMENTS AND THE LIKE
Filed Jan. 21, 1941 2 Sheets-Sheet 1
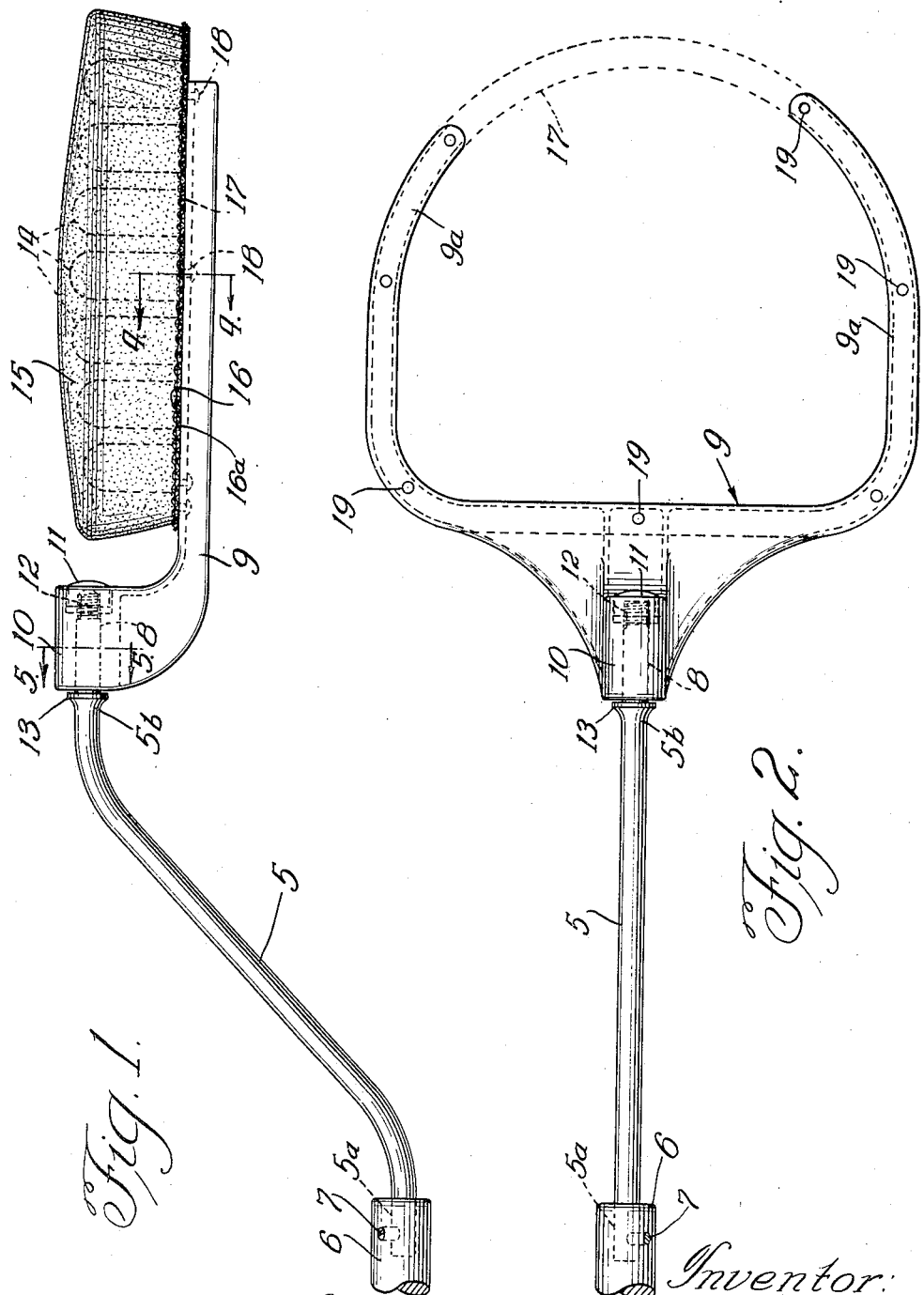

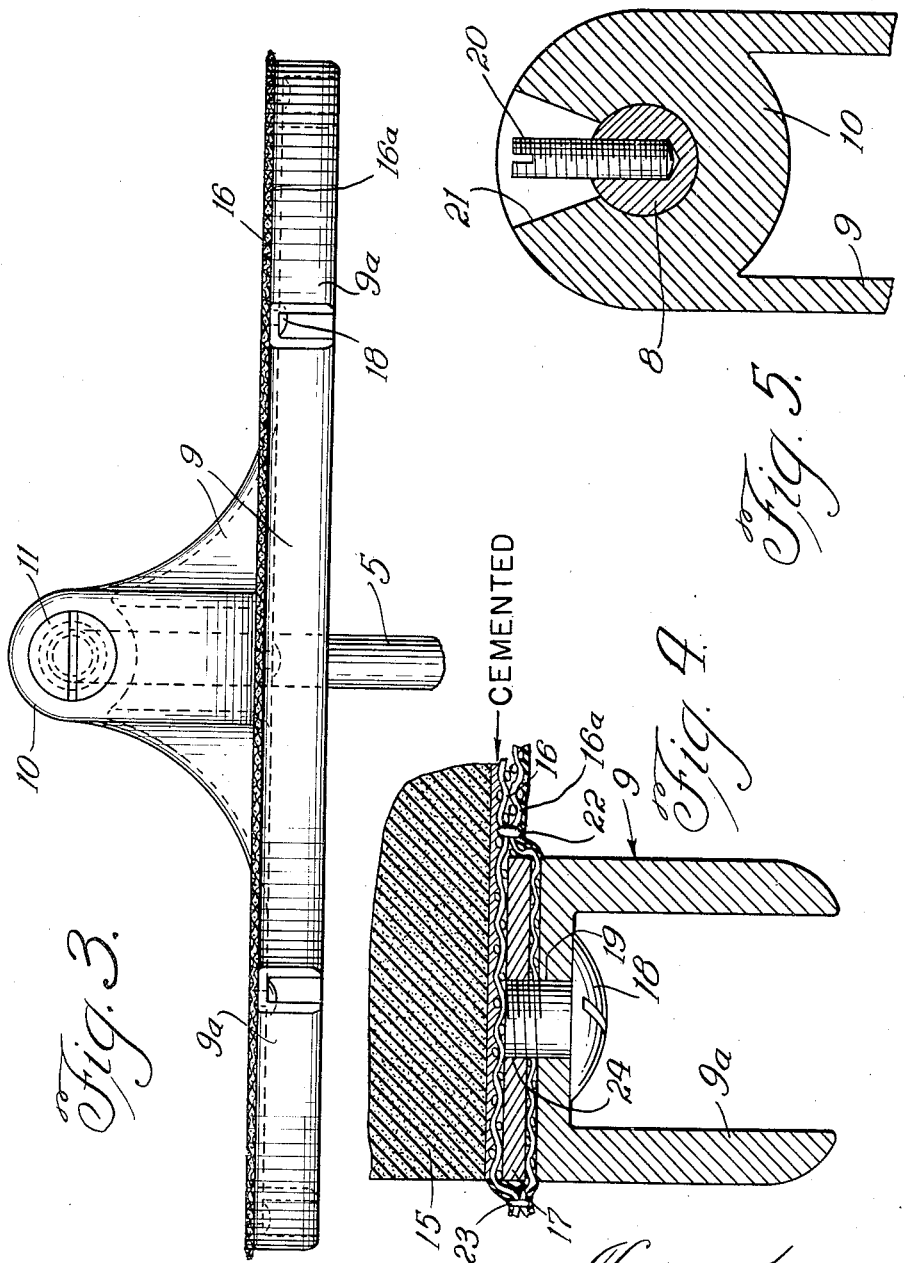

Patented Feb. 20, 1945

2,370,014

UNITED STATES PATENT OFFICE 2,370,014

SEAT FOR FARM IMPLEMENTS AND THE LIKE

Marion Morgan Cunningham, South Bend, Ind., assignor to Mishawaka Rubber and Woolen Manufacturing Company, Mishawaka, Ind., a corporation of Indiana Application January 21, 1941, Serial No. 375,139

3 Claims. (Cl. 155—121)

This invention relates to seats, especially seats for agricultural implements, tractors, and the like, and seeks to provide a simple and convenient seat structure which is readily applicable to existing farm implements, tractors and the like and affords greater comfort and less fatigue than previous seats.

More specifically it is an object of the invention to provide a seat which is self-leveling laterally, so as to permit the seat occupant to remain in upright seated position even though the implement tilts laterally. Another object is to provide a seat of minimum depth but with ample cushioning properties to effectively absorb the jarring and shock of riding over rough and uneven terrain. Another object is to provide a seat which may readily be substituted for present types of seats without change in the machines, these and other objects being accomplished as pointed out in the following description and as shown in the accompanying drawings, in which:

Fig. 1 is a side elevation of a seat constructed in accordance with my invention;

Fig. 2 is a top view of the structure of Fig. 1 with the seat cushion omitted;

Fig. 3 is an enlarged rear view of the seat frame with the fabric cushion deck thereon;

Fig. 4 is an enlarged fragmentary sectional view on the line 4—4 of Fig. 1; and

Fig. 5 is an enlarged sectional view on the line 5—5 of Fig. 1 but showing a modification thereof.

Referring particularly to the drawings, the seat is supported on the outer elevated end of a bent spring steel rod 5, the lower end 5ᵃ of which is secured by a set screw 7 in a bracket or socket member 6 which is provided for the purpose on the frame of the implement (not shown).

Preferably the upper end 5ᵇ of the spring rod 5 extends horizontally and is formed with a stem portion 8 affording a swivel mounting for the seat which is carried by a seat frame 9. This frame 9, which is preferably channeled on the under side as shown in Figs. 2, 3 and 4, has at the front an elevated bearing 10 which is bored to loosely engage the stem 8, the outer end of which is threaded as at 12 to receive a nut 11 by which the seat frame 9 is secured on the stem 8. The bearing 10 is preferably counterbored as shown, to receive the nut 11 and at the forward end of the stem 8 the rod 5 is formed with a shoulder 13 between which and the nut 11 the bearing 10 is secured on the stem 8, the arrangement being such that the bearing 10 turns freely on the stem 8.

The seat frame 9 which is preferably shaped as shown in Fig. 2 with a pair of laterally spaced arms 9ᵃ separated at their rear ends as shown has the seat supporting surface thereof located at a sufficient distance below the swivel axis of the bearing 10 so that the center of gravity of the seat is below the swivel axis and the seat is thus self-leveling regardless of the lateral tilting of the implement on which the seat supporting spring rod 5 is mounted.

Instead of employing a nut 11 for securing the seat frame on the stem 8 a set screw 20 may be inserted through the opening 21 in the top of the bearing 10 into the stem 8 as shown in Fig. 5 and the opening 21 may be circumferentially elongated to permit the swivel action of the bearing 10 on the stem 8, and it will be readily understood that the circumferential elongation of the opening 21 may be of limited extent somewhat as indicated in Fig. 5, to limit the swiveling action of the seat frame and seat on the stem 8 to any desired extent.

Any desired form of seat cushion may be mounted on the swivel seat frame 9, but I prefer to employ a molded foam rubber cushion such as indicated at 15 which may be provided with cored out openings 14 extending upwardly therein from the bottom in a manner customary and well known in the manufacture of such cushions.

For supporting this cushion 15 on the frame 9, I prefer to employ a cushion deck such as disclosed in my application Serial No. 347,627, filed July 26, 1940, comprising a flat marginal steel frame 17 corresponding in contour to the seat frame 9 and to the cushion 15, and which has tightly stretched thereon a deck of two fabric layers 16 and 16ᵃ between the outer margins of which the frame 17 is secured by inner and outer rows of stitching 22 and 23 respectively. This frame is provided with threaded openings 24 at intervals therearound and the frame 9 with corresponding unthreaded openings to accommodate screws 18 which are inserted upwardly through the frame openings 19 and threaded into the openings 24 of the seat deck frame 17 to secure the latter in place on the frame 9.

The cushion 15 is cemented to the top of the fabric seat deck 16—16ᵃ throughout the area thereof, this being preferably done at the factory in the manufacture of the seat cushion which is furnished as a unit with the attached seat deck 16—16ᵃ ready for mounting on the seat frame 9.

With this construction a seat of exceptionally high cushioning properties is afforded as the tensioned fabric 16—16ª is yieldable and provides cushioning properties in addition to those of the cushion 15, and moreover by the swivel arrangement of the seat support 9 on the stem 8 and the arrangement of the center of gravity of the seat below the swivel action, the seat is self-leveling and adapts itself to the sidewise tilting of the implement on which it is mounted, thereby tending to maintain the occupant in an upright position irrespective of such tilting of the implement.

The rubber cushion itself by its capability of conforming to the seat occupant and its frictional characteristics safely holds the seat occupant in place and it will be readily understood that the structure is readily adaptable to conventional implements without special construction thereof for seat attaching purposes.

While I have shown and described my invention in a preferred form, I am aware that various changes and modifications may be made therein without departing from the principles of my invention, the scope of which is to be determined from the following claims.

I claim as my invention:

1. In a seat structure of the class described, the combination of a support, an open ended seat frame having a front portion pivoted at its upper end to the support so as to swing laterally on the support, said seat frame having a lower horizontal supporting portion in the form of a pair of laterally spaced rearwardly extending arms below the axis of the pivot, a yieldable seat deck including a surrounding marginal frame mounted on and extending between said arms, and a cushion mounted on said deck.

2. In a seat structure of the class described, the combination of a support, an open ended seat frame having a front portion pivoted at its upper end to the support so as to swing laterally on the support, said seat frame having a lower horizontal supporting portion in the form of a pair of laterally spaced rearwardly extending arms below the axis of the pivot, a yieldable seat deck mounted on and extending between said arms, said seat deck comprising a fabric stretched on a surrounding flat marginal frame which is secured to said seat frame arms, and a cushion secured to said deck.

3. In a seat structure of the class described, a support including a horizontally disposed stem portion, a seat base having a front portion depending from said stem portion and a supporting portion extending horizontally from the lower end of said depending portion, the upper end of said depending portion being horizontally bored and pivotally receiving the stem portion of said support, the upper end of said depending portion having a laterally elongated slot communicating with said bore, and a member within said slot and in threaded engagement with said stem portion for retaining said seat base thereon but permitting limited lateral swinging thereof.

MARION MORGAN CUNNINGHAM.